INVENTOR.
OTTO E. HINTZ
PETER SAMMARCO

ATTY.

Aug. 5, 1958  O. E. HINTZ ET AL  2,845,769
FORAGE HARVESTER CROP GATHERING DEVICE
Filed June 12, 1953  4 Sheets-Sheet 3

INVENTORS.
OTTO E. HINTZ
PETER SAMMARCO
Paul O. Pippel
ATTY.

Aug. 5, 1958   O. E. HINTZ ET AL   2,845,769
FORAGE HARVESTER CROP GATHERING DEVICE
Filed June 12, 1953   4 Sheets-Sheet 4

INVENTORS.
OTTO E. HINTZ
PETER SAMMARCO

ATTY.

United States Patent Office 2,845,769
Patented Aug. 5, 1958

2,845,769

FORAGE HARVESTER CROP GATHERING DEVICE

Otto E. Hintz, Riverside, and Peter Sammarco, Chicago, Ill., assignors to International Harvester Company, a corporation of New Jersey Application June 12, 1953, Serial No. 361,262

12 Claims. (Cl. 56—344)

This invention relates to forage harvesters and more particularly to a novel wide swath gathering means therefor especially adapted for gathering hay or the like directly from the field.

A general object of the invention is to devise a novel pick-up for a narrow throat field harvester wherein an overshot picking device is provided at the narrow front end of the throat and a pair of rake wheels are disposed in overlapping relationship at one side of the pick-up for delivery thereto.

A further object of this invention is to devise a novel assembly for mounting the rake wheels in such manner that each rake wheel has independent floating action relative to the other.

A more specific object of the invention is to devise a novel rake wheel assembly incorporating a diagonal slide shield against which the hay is adapted to be tossed up by the wheels and slid laterally toward the narrow throat.

Another object is to devise a crop gatherer incorporating a transverse pick-up with a side delivery raking device extending laterally therefrom for delivery thereto, said raking device incorporating raking wheels mounted upon independently floating but mutually sustaining frame sections.

A further object is to provide in the organization last described, a novel mounting for the frame sections such that the rake wheel discharging directly into the pick-up device is accommodated by up and down movement but prevented from moving laterally toward and away from the pick-up in order to maintain its proper discharge relationship to the pick-up whereas the remaining wheels are accommodated by both movements in order to more closely follow the terrain and individually surmount any obstructions.

These and other objects of the invention will become more apparent from the specification and the drawings, wherein.

Figure 1:
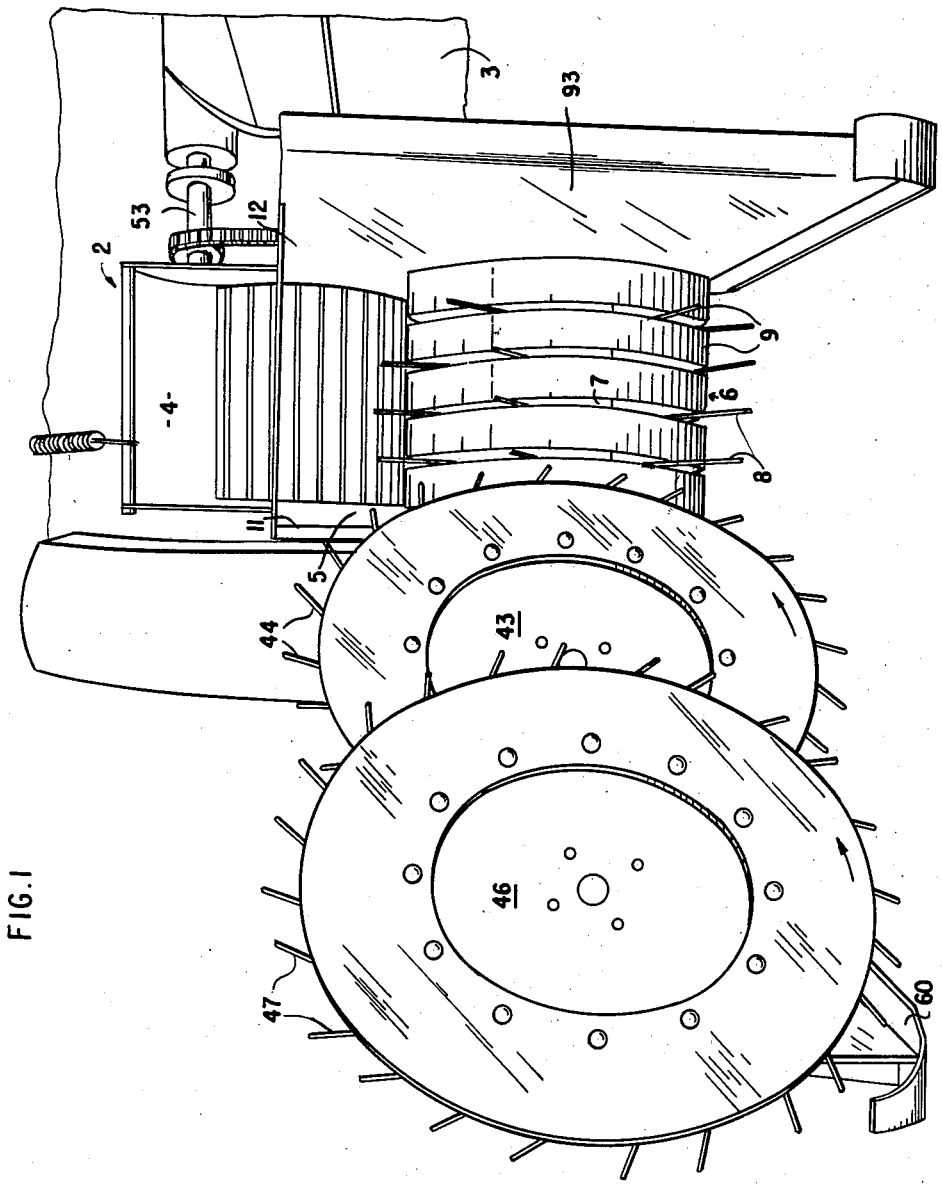
Figure 1 is a front perspective view of a fragmentary portion of a forage harvester incorporating the invention with portions omitted in order to clarify the illustration.
Figure 2:
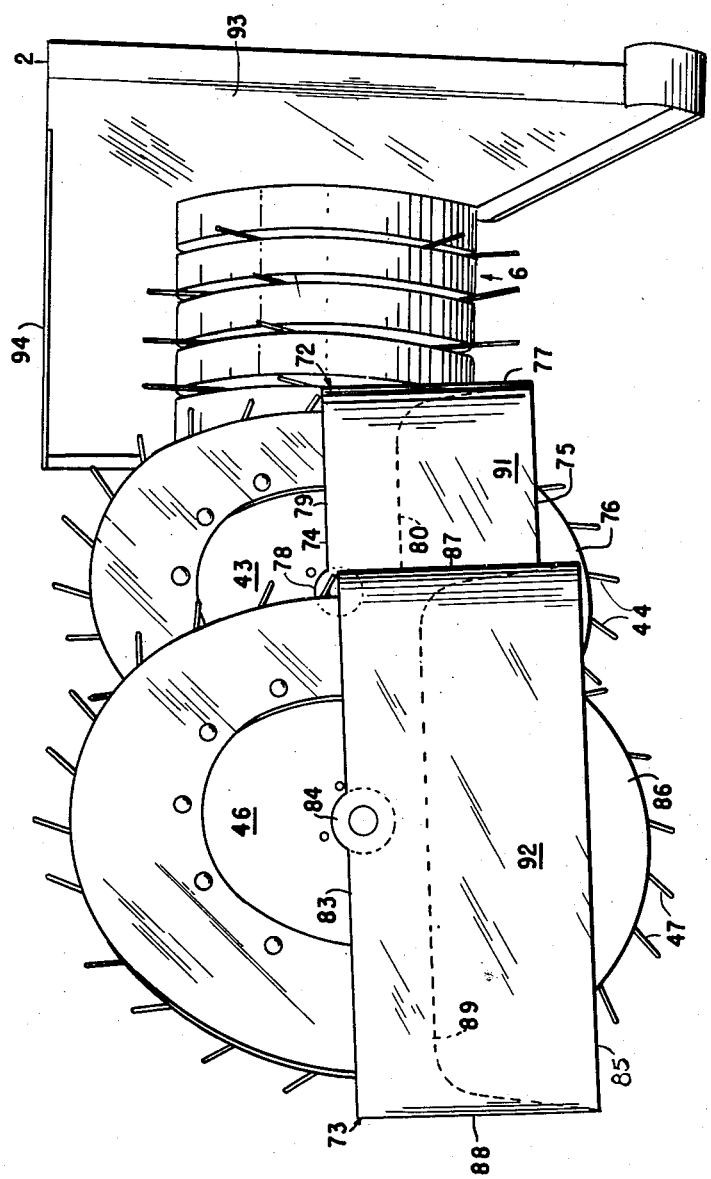
Figure 2 is a further fragmentary view similar to Figure 1 and showing the rake wheel assembly with the shields in place.

Describing the invention in detail, the forage harvester generally designated 2 is shown mounted upon a wheeled ambulant structure 3 in the form of a tractor, said harvester 2 comprising a processing component and crop receiving means 4 with a narrow leading forward throat structure or inlet 5 at the forward end of which is provided a transverse pick-up 6 comprising a revolving drum 7 carrying a plurality of outstanding fingers 8 disposed in interdigitating relationship with a plurality of laterally spaced stripper bars 9, 9 which are wrapped about the drum, the stripper bars being carried from a cross beam 10 extending between a pair of side panels 11 and 12 of the throat structure 5 of the ambulant housing generally designated 13 (Figure 4) of the harvester, said panels 11 and 12 being laterally spaced apart and extending lengthwise in a fore-and-aft direction and defining the lateral sides of the throat 5. The drum 7 of the pick-up comprises a center shaft or member 14 which is journalled in the walls 11 and 12 of the throat, the driving shaft or member 14 having an extension 15 projecting horizontally transversely of one side of the throat structure and having an outer end portion 16 which is rotatably mounted in a bearing 17 on a diagonal compression bar 18, said bar 18 extending rearwardly from the shaft 15 and connected at its rear end to the cross beam 10 as at 19. The shaft 15 is disposed substantially horizontally at right angles to the line of draft of the unit and affords a mounting for a rake frame generally designated 20. The rake frame extends forwardly of the shaft 15 and comprises an inboard section 21 and an outboard section 22, said sections being articulatingly interconnected on a substantially horizontal generally fore-and-aft extending axis as hereinafter described. The inboard section 21 comprises laterally spaced legs 23 and 24 which comprise rear end portions provided with bearings or sleeves 25 and 26 respectively, the bearing 25 being sleeved over the shaft 15 adjacent to the wall 11 and the bearing 26 being rotatably mounted on the extension 15 adjacent to its outboard end. The inboard section is thus accommodated a pivotal mounting on a transverse generally horizontal axis. The legs 23 and 24 are interconnected adjacent to their forward ends 23' and 24' by a cross bar 28 and the outboard forward ends of the legs 24 and 23 are provided with bearings 29 and 30 respectively which rotatively mount a driven shaft 32, said shaft pivotally mounting bearings 33 and 34 on the inboard rear ends of laterally spaced legs 35 and 36 of the generally triangularly shaped outboard section 22 of the rake frame 20, said sections 21 and 22 being disposed in tandem laterally of the housing. The legs or bars 35 and 36 of frame section 22 are interconnected at their forward lateral ends by a tubular cross piece 37 and a diagonal brace 38 extending from the forward end of the bar 36 to the rear inboard end of the bar 35.

The shaft 32 extends forwardly of the shaft 15 and is angled in an inboard direction, that is, toward the pick-up 6 in forwardly converging relationship to the center plane of the throat, indicated CL—CL, which may represent the line of draft of the device, said shaft 32 having a gear 40 connected to its rear end and meshing with the gear 42 keyed on the outboard end 16 of the extension 15. The forward end of the shaft 32 is provided with a mounting plate or rake wheel 43 which mounts a plurality of outwardly extending rake teeth or tines 44, 44 which are adapted to rake over the stubble. The tubular member 37 which is disposed at the outboard end of the outboard portion 22 of the rake frame journals a shaft 45 which at its forward end mounts a rake wheel 46 in the form of a circular plate which is provided with a plurality of radially outwardly extending rake teeth 47, 47 adapted to rake over the stubble in the field. It will be seen that the outboard wheel 46 is disposed forwardly of the inboard rake wheel 43 and that these wheels are arranged in echelon formation with the wheel 46 peripherally overlapping at its inboard edge the outboard edge of the rake wheel 43 as best seen in Figure 1. The shaft 32 is provided with a sprocket 50 which drives a chain 51 in turn driving a sprocket 52 which is connected to the shaft 45 and drives the rake wheel 46 in the same direction as shown by the arrows in Figure 1. As best seen in Figure 1 the drive is transmitted from a power source which in the present instance is the power take-off 53 of the tractor and the drive therefrom is through a sprocket 54 (Figure 3) and through a sprocket assembly 54' which drives a chain 55 driving a sprocket 56 which is connected to the drive shaft 15 which in turn drives the gear 42 which meshing with gear 40 drives the shaft 32 in the direction shown by the arrow.

Figure 3:
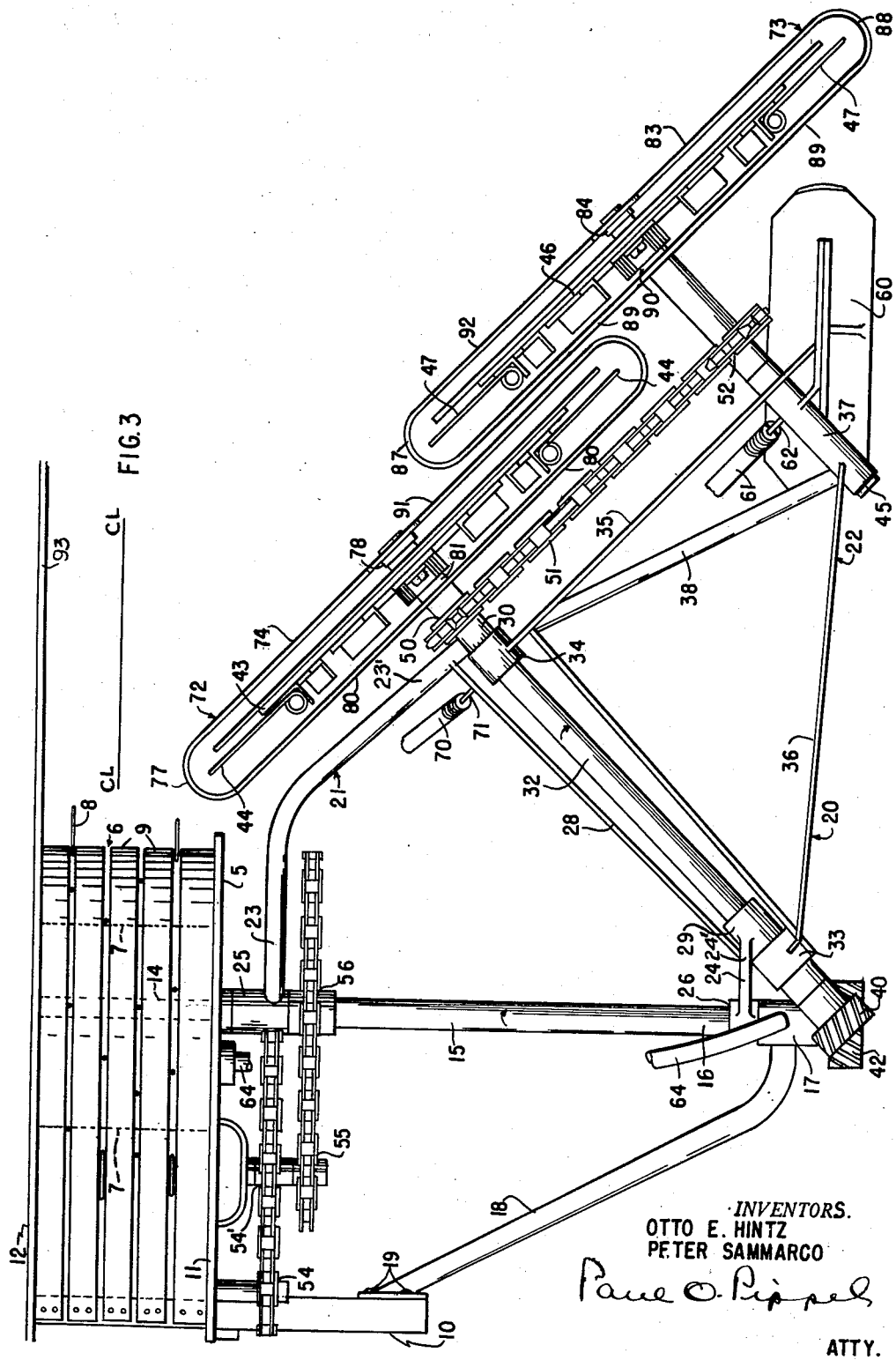
Figure 3 is an enlarged plan view of the novel rake and pick-up combination.

It will be noted from a consideration of Figure 3 that the sections 21 and 22 of the rake frame are articulatingly interconnected on a generally fore-and-aft axis and that the outboard section 22 of the rake frame which carries the wheel 46 has a depending ground engaging runner 60 connected to the tubular member 37 so that both sections are mutually self sustaining. The wheel 46 has independent vertical movement relative to wheel 43 about the shaft 32 to ride over an obstruction or follow the contour of the land. This vertical movement is accompanied by lateral movement of the wheel 46 to and fro with respect to the housing. The inboard frame section 21, however, is accommodated pivotal movement only about a horizontal transverse axis defined by the shaft 15 to permit up and down movements of the wheel 43 as well as wheel 46 therewith, however, wheel 43 is prevented from movement laterally to and fro with respect to pick-up so that its discharge position to the drum 6 is maintained.

Figure 4:
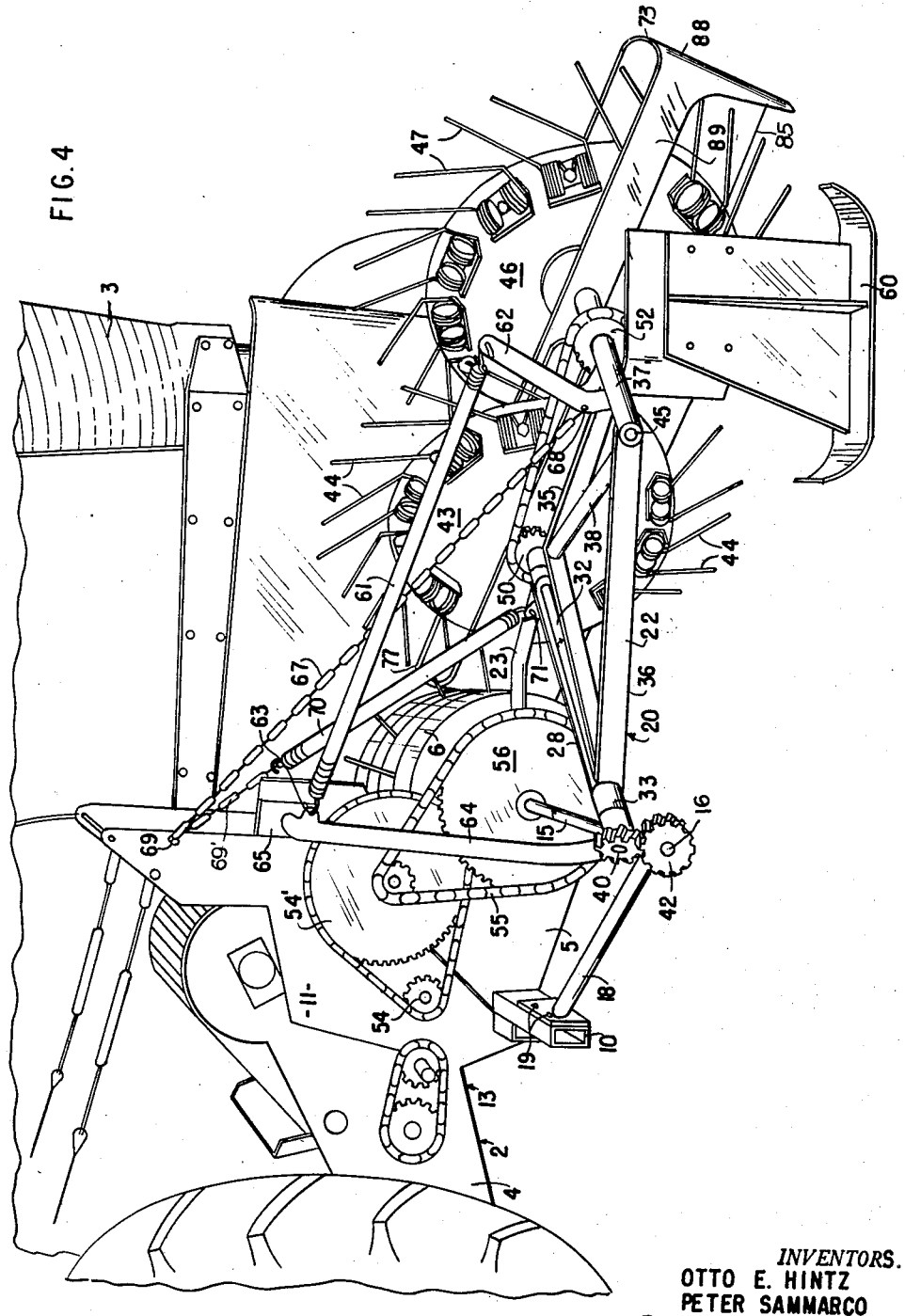
Figure 4 is a reduced side perspective view of the novel mechanism shown mounted upon a tractor.

It will be noted from a consideration of Figure 4 that the outboard frame section is yieldably supported from the ambulant frame structure or the housing 13 by means of a tension spring 61 connected at a lower end to an arm 62 on the tubular member 37 and at its upper end is hooked as at 63 to an eye formed on a laterally extending draft bar 64 which at its inner end is connected to a standard 65 formed as part of the housing structure 13 and at its opposite end extends diagonally downwardly and is connected to the bearing 17. The bars 64 and 18 and shaft 15 constitute a lateral draft frame or support for the rake. A flexible limiting element to prevent excessive downward movement of the outboard frame section 22 is provided in the form of a chain 67 (Figure 4) having one end connected as at 68 to the arm 62 and the opposite end connected as at 69 to a portion of the housing 13. The inboard frame section is similarly yieldingly supported by a tension spring 70 which at its lower end is hooked as at 71 to the bar member 28 and its upper end is connected to the point 69 of the housing by a chain 69' which extends through the spring 70 and connects therewith at 71 with the section 21 to limit downward movement thereof.

The rake wheels 43 and 46 are provided with shields 72 and 73 respectively. The shield, or guide, 72 comprises a forward generally vertical panel 74 disposed parallel to wheel 43 in front thereof and extends to a lower edge 75 which subtends the lower portion of the wheel which provides the effective raking sector 76.

The lateral extent of the panel 74 is slightly larger than the diameter of the raking wheel 43 including its teeth. The inboard edge 77 of the panel 74 which defines a stripping means for the wheel 43 overlaps the outboard extremity of the pick-up. The shield is hung on a center bearing 78 connected to the panel intermediate its lateral extremes adjacent to its upper edge 79 which approximates the diameter of wheel 43. The lateral edges of panel 74 are continued about the diametrically opposite extremes of the wheel 43 and bent therearound to provide straps 80, 80 which extend and connect to a bearing 81 mounted on shaft 32 back of the wheel 43, whereas the bearing 78 is disposed in front of wheel 43 and journalled on an extension of shaft 32. The shield is balanced laterally to provide a substantially horizontally disposed bottom edge which serves to strip the hay from the fingers.

Similarly the shield, or guide, or stripper, 73 is carried by the wheel 46 and comprises a front upright panel 83 which depends from a center bearing support 84 journalled upon shaft 45, the bottom edge 85 subtends the active sector, or lower portion, 86 of the rake means 46 and the inboard and outboard lateral edges 87 and 88 which define stripping means for the wheel 46 are bent about opposite diameter extremes of the wheel 46 and are provided with inturned straps or supports 89 which are connected to a bearing 90 journalled upon shaft 45. It will be noted that the shields in addition to providing a stripping action for the fingers provide forward slide surfaces 91 and 92, respectively, which are angled similarly to the wheels as respects the direction of travel and converge rearwardly with a forward fore and aft extension panel 93 of the inboard wall 12 of the throat structure, said panel 93 being in transverse alignment with the rake means and at its upper edge connected to a generally horizontal roof plate 94 interconnecting the upper edges of walls 11 and 12 and projecting forwardly of the pick-up and laterally over the inboard portion of the inboard wheel 43 in spaced relationship thereto.

Operation of the harvester

In operation, the harvester which is carried by the tractor is moved forwardly along a wide swath of hay and the pick-up and rake wheels are powered as hereinbefore indicated whereby the rake wheels as seen in Figure 1 rotate in a counterclockwise direction, the wheel 46 delivering to the wheel 43 which in turn delivers to the pick-up 6 which in turn delivers to the processing component to the harvester. Should the outboard wheel run over terrain which is at a lower level than that of the inboard wheel it will drop by pivoting about the shaft 32. If simultaneously the wheel 43 should require to rise it would pivot upwardly about the shaft 15.

It will be understood that in lieu of the power drive of the rake wheels 43 and 46, the drive could be eliminated and these wheels could drive merely through engagement with the stubble as shown in U. S. Patent 2,447,354. It will be understood that the hay is kicked up by these wheels against surfaces 92 and 91 and slid laterally. The lateral balance of the shields always maintains the lower edges parallel to the ground irrespective of the movements of the wheels.

Various other features and objects of the invention not specifically enumerated above will be apparent to those versed in the art, as likewise will numerous modifications and alterations in the preferred construction illustrated, all of which may be achieved without departing from the spirit and the scope of the invention as defined in the appended claims.

We claim:

1. A device for gathering cut hay and the like in a field comprising a field traversing support, crop receiving means carried thereby and having a forward end inlet, a ground sweeping pick-up carried by said means adjacent to said inlet in delivering relationship thereto, a flexible frame structure adjacent to a side of said pick-up comprising a pair of laterally extending inboard and outboard portions articulatingly interconnected, said inboard portion disposed between said outward portion and said pick-up and pivotally connected to said support on a transverse axis extending substantially perpendicular to the line of draft of the device, and rotary raking wheels rotatably mounted upon their respective portions in peripheral overlapping relationship and disposed in upright planes angled to the line of draft of said device, and said wheel upon said inboard portion disposed in delivering relationship to said pick-up, said entire frame structure and wheels thereon swingable together about said axis perpendicular to said line of draft and said inboard portion swingable solely upwardly and downwardly about said transverse axis thereby maintaining the delivering relationship of said raking wheel thereon with respect to said pick-up, and said outboard portion swingable on said fore-and-aft axis toward and away with respect to said pick-up laterally of the direction of movement of the device.

2. In a device for harvesting cut crops from a field, a forwardly movable support structure including a laterally extending member, a first frame pivoted to said member on an axis extending generally horizontally, laterally as respects the direction of movement of said support frame, a second frame disposed in laterally contiguous relationship with said first frame and pivotally connected therewith on a generally horizontal axis disposed diagonally to said laterally extending axis, rotary rake means rotatably mounted upon each frame on a fixed axis thereto and in peripherally overlapping relation in a substantially upright plane angularly related to said forward direction of travel, said first frame solely pivotal about said first-mentioned axis whereby said rake means thereon are limited to pivotal up and down movement therewith and fixed against movement relative to said support laterally as respects said direction of movement of the structure, said second frame pivotal with said first frame about said lateral axis and pivotal relative to the first frame about said second mentioned axis whereby said rake means on the second frame are pivotal up and down as well as laterally toward and away from said rake means on said first frame.

3. In a crop gathering mechanism, an ambulant support, a rake wheel journalled thereupon and disposed in a generally upright plane facing angularly into the direction of travel of said mechanism, and a shield having a panel carried from said support immediately ahead of said wheel generally parallel thereto and having a lower edge subtending the lower portion of said rake wheel and providing a slide surface for crops generally parallel to said wheel and disposed in crop-receiving relationship from said rake wheel, and means pivotally supporting said shield from said support on an axis generally coaxial with the axis of rotation of said wheel, said shield substantially balanced laterally to maintain said lower edge substantially horizontal.

4. In a crop gathering device, an ambulant support, a first frame pivoted thereon on a generally horizontal axis extending transversely perpendicular the direction of movement of said device, a second frame disposed laterally along said first and connected thereto on a generally horizontal axis angularly related to said first-mentioned axis, independent raking means rotatably journalled upon each section and positioned in an upright plane facing sidewise into the direction of travel at an angle thereto, and driving means for said raking means operatively connected thereto, said first and second frames and raking means thereon pivotal together on said first axis and said second frame and raking means thereon pivotal about said second axis.

5. A side delivery device comprising a forwardly movable field traversing structure including a support member extending laterally as respects to said direction of movement, a rake frame positioned thereahead and comprising a pair of sections articulatingly interconnected on an axis disposed at an acute angle to the line of draft of said device, one of said sections having a portion disposed along said member and pivotally connected thereto on an axis substantially normal to said line of draft, and said device pivotal in toto about said last-mentioned axis, the other of said sections disposed forwardly and laterally of said one section, and rake wheels positioned forwardly of respective sections and mounted thereon for rotation in substantially upright planes disposed substantially perpendicular to said axis of articulation of said sections.

6. In a side delivery raking device having a forwardly movable support including a transversely extending member, a flexible rake frame structure comprising a plurality of lateral frame sections disposed in end to end relationship and interconnected at adjacent ends on a substantially horizontal axis extending diagonally to the direction of movement of said device, one of said sections pivoted to said member on a generally horizontal axis extending substantially perpendicular to the direction of movement of said device and said device pivotal in toto about said last-mentioned axis, and a plurality of peripherally overlapping rotary raking means mounted on said sections in echelon arrangement and each rotatable in a plane at an angle to the direction of travel of said device.

7. A device according to claim 6 and a guide in front of each of said raking means carried by the related section and extending generally parallel to the associated raking means and having a lower generally rectilinear edge disposed in subtending relation to the lower portion of the related raking means and cooperatively associated therewith in receiving relation to crops thrown thereby to advance the crops laterally of the direction of movement of the device.

8. In a crop gathering device, an ambulant support, a first rake means pivotably carried from said support on a generally horizontal axis extending transversely to the line of draft of said device, a second rake means arranged in delivering relationship to said first rake means, and means operatively pivotally supporting said second rake means on a generally fore-and-aft extending axis, said both raking means pivotal together about said first-mentioned axis, and said second raking means additionally pivotal about said second-mentioned axis.

9. In a raking device, an ambulant support structure, a wheel-like element, means for supporting said element with respect to said structure for rotation in its own plane and at an angle to the direction of movement of the structure for raking crops with its lower portion laterally attendant to advance of said element with said structure, and means supported from said structure and providing a crop slide surface in advance of said element cooperatively associated with said lower portion of said element for guiding the crops chordwise thereof incidental to said crops being raked by said element, and a plate-like member positioned in front of said wheel-like element and pivotally mounted on said first-mentioned means and balanced diametrically relative to said element.

10. In a raking device, an ambulant support structure, a wheel-like element, means for supporting said element with respect to said structure for rotation in its own plane and at an angle to the direction of movement of the structure for raking crops with its lower portion laterally attendant to advance of said element with said structure, and means supported from said structure and providing a crop slide surface in advance of said element cooperatively associated with said lower portion of said element for guiding the crops chordwise thereof incidental to said crops being raked by said element, and a plate-like member having a front portion disposed immediately ahead of said element and said member having a front side presenting said slide surface, and said member having a lateral extremity extending beyond the periphery of said element, and stripping means associated with said extremity and positioned in substantially radial alignment with said element in stripping relation thereto for removing crops carried by said lower portion thereof.

11. In a raking device, an ambulant support structure, a wheel-like element, means for supporting said element with respect to said structure for rotation on a generally horizontal axis in its own plane and at an angle to the direction of movement of the structure for raking crops with its lower portion laterally attendant to advance of said element with said structure, and a plate member pivoted intermediate its ends from said structure and laterally balanced diametrically of said element in advance thereof and having a lower edge subtending said lower portion of said element chordwise thereof and providing a crop slide surface in advance of said element cooperatively associated with said lower portion of said element for guiding the crops chordwise thereof incidental to said crops benig raked by said element.

12. In a raking device, an ambulant structure, a driving shaft journalled thereon and extending generally horizontally substantially at right angles to the direction of movement of said structure, a first frame having a pair of legs spaced axially on said shaft and each leg having a rear bearing portion pivoted on said shaft, said legs projecting forwardly of said shaft, a driven shaft journalled on said legs and extending substantially horizontally forwardly from said driving shaft at an acute angle thereto, means drivingly coupling said shafts for rotation of the latter by the former, a first raking wheel connected to said driven shaft and positioned forwardly of said first frame for rotation in an upright plane and having peripheral raking means for raking crops laterally of said device, a second frame having a pair of legs with rear end portions spacedly journalled on said driven shaft, a countershaft journalled on said second-mentioned legs, a second raking wheel connected for rotation with said countershaft and positioned in generally parallel overlapping relation to said first rake wheel, and a driving train drivingly interconnecting said driven shaft with said countershaft and comprising a sprocket on each with a chain thereabout positioned generally parallel to said rake wheels.

References Cited in the file of this patent
UNITED STATES PATENTS

| | | |
|---|---|---|
| 1,251,492 | Finley | Jan. 1, 1918 |
| 1,877,770 | Larson | Sept. 20, 1932 |
| 2,486,766 | Stenzel | Nov. 1, 1949 |
| 2,625,000 | Benbow | Jan. 13, 1953 |
| 2,657,519 | Hill | Nov. 3, 1953 |
| 2,735,256 | West | Feb. 21, 1956 |

FOREIGN PATENTS

| | | |
|---|---|---|
| 19,559 | Great Britain | Sept. 1, 1906 |
| 244,004 | Great Britain | Dec. 10, 1925 |